(12) United States Patent
Iwai et al.

(10) Patent No.: US 12,047,712 B2
(45) Date of Patent: Jul. 23, 2024

(54) SURVEILLANCE DEVICE, SURVEILLANCE SYSTEM, AND SURVEILLANCE METHOD

(71) Applicant: Panasonic Intellectual Property Management Co., Ltd., Osaka (JP)

(72) Inventors: Kazuhiko Iwai, Kanagawa (JP); Shin Yamada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 17/894,813

(22) Filed: Aug. 24, 2022

(65) Prior Publication Data
US 2023/0064953 A1 Mar. 2, 2023

(30) Foreign Application Priority Data

Sep. 1, 2021 (JP) .................................. 2021-142309

(51) Int. Cl.
| | |
|---|---|
| *H04N 7/18* | (2006.01) |
| *G06V 20/52* | (2022.01) |
| *G08B 13/196* | (2006.01) |
| *H04N 23/62* | (2023.01) |

(52) U.S. Cl.
CPC ............. *H04N 7/181* (2013.01); *G06V 20/52* (2022.01); *G08B 13/196* (2013.01); *H04N 23/62* (2023.01)

(58) Field of Classification Search
CPC ........ H04N 7/181; H04N 23/62; H04N 23/63; G06V 20/52; G06V 10/147; G06V 10/22; G08B 13/196; G08B 13/19602; G08B 13/19645; G08B 13/19689

USPC ................................................. 348/143, 152
See application file for complete search history.

(56) References Cited

U.S. PATENT DOCUMENTS

| | | | |
|---|---|---|---|
| 9,489,745 B1 * | 11/2016 | Heitz, III | ................. G06T 7/50 |
| 11,828,598 B1 * | 11/2023 | Mastrangelo | .......... G06V 20/17 |
| 2012/0026326 A1 * | 2/2012 | Itoh | ........................ G06V 10/30 348/143 |
| 2017/0195556 A1 * | 7/2017 | Emi | ................. G08B 13/19604 |
| 2018/0232592 A1 * | 8/2018 | Stewart | ............ G08B 13/19606 |

(Continued)

FOREIGN PATENT DOCUMENTS

| | | |
|---|---|---|
| JP | 2019-147443 | 9/2019 |
| JP | 2019147443 A * | 9/2019 |

*Primary Examiner* — Hung Q Dang
*Assistant Examiner* — Stephen R Smith
(74) *Attorney, Agent, or Firm* — Greenblum and Bernstein, P.L.C.

(57) ABSTRACT

A surveillance device of the present disclosure includes an image analysis server that generates an alarm when detecting an alarm generation target that has entered an intrusion detection area, based on a camera image captured by a camera. The image analysis server acquires the camera image (basic image) to set a fixed object area (basic area) corresponding to a fixed object included in the basic image, acquires a camera image (live image) to extract a fixed object area (reference area) corresponding to a fixed object included in the live image, calculates a deviation amount of an angle of view based on a result of a comparison in standard position between the basic area and the reference area, and generates a surveillance screen including an adjustment screen for guidance on an operation for cancelling the deviation amount of the angle of view to display the surveillance screen.

17 Claims, 17 Drawing Sheets

(56) References Cited

U.S. PATENT DOCUMENTS

| | | | |
|---|---|---|---|
| 2020/0327682 A1* | 10/2020 | Nater | G06V 10/255 |
| 2021/0067740 A1* | 3/2021 | Watahiki | H04N 7/181 |
| 2023/0056104 A1* | 2/2023 | McRae | G08B 13/196 |
| 2023/0412919 A1* | 12/2023 | Van Der Heide | H04N 23/611 |

* cited by examiner

SURVEILLANCE DEVICE, SURVEILLANCE SYSTEM, AND SURVEILLANCE METHOD

BACKGROUND

1. Technical Field

The present disclosure relates to a surveillance device and a surveillance system capable of reliably detecting a deviation in an angle of view and easily adjusting a deviation amount of the angle of view in a surveillance camera.

2. Description of the Related Art

In recent years, a known railroad crossing surveillance device surveys whether an obstacle is present in a railroad crossing, based on a captured image obtained by a surveillance camera that captures the railroad crossing (see Unexamined Japanese Patent Publication No. 2019-147443). The railroad crossing surveillance device specifies a target area where a surveillance is made whether the surveillance camera has caused a position change without using a dedicated gyro sensor or the like that detects a position change of the surveillance camera, and calculates an amount of the position change of the surveillance camera based on a deviation amount of a straight line portion included in a basic image in a normal state and a comparison image at a time of capturing the target area.

According to a conventional technique, a target area is specified in a surveillance area, a surveillance camera calculates a change in position and attitude from an initial position based on a relative movement amount of a point where a straight line portion included in the target area intersects an outer periphery of the target area, and outputs position data to transmit an attention signal for position adjustment.

Therefore, when an appropriate straight line portion does not exist in the surveillance area or when a straight line portion exists far away, a target area where a change in position and attitude is calculated from an initial position of the surveillance camera cannot be set. In a certain case, an object or the like entering a detection area is detected by using an image recognition model (machine learning model) constructed by machine learning such as deep learning. Particularly in such a case, even if an angle of view of the surveillance camera deviates, it is desirable to adjust a deviation amount of the angle of view and enable reuse of the already constructed machine learning model. However, in the conventional technique, no consideration is given to a mechanism for easily adjusting the deviation in the angle of view.

SUMMARY

A surveillance device according to an exemplary embodiment of the present disclosure includes a processor that generates an alarm when detecting an alarm generation target that has entered an intrusion detection area, based on a captured image captured by an imaging device. The processor acquires a basic image of the captured image to set a basic area corresponding to a fixed object included in the basic image, acquires a live image of the captured image to extract a reference area corresponding to a fixed object included in the live image, calculates a deviation amount of an angle of view based on a result of a comparison in standard position between the basic area and the reference area, and generates and displays a surveillance screen including an angle-of-view adjustment screen for guidance on an operation for cancelling the deviation amount of the angle of view.

DETAILED DESCRIPTION

Figure 1:
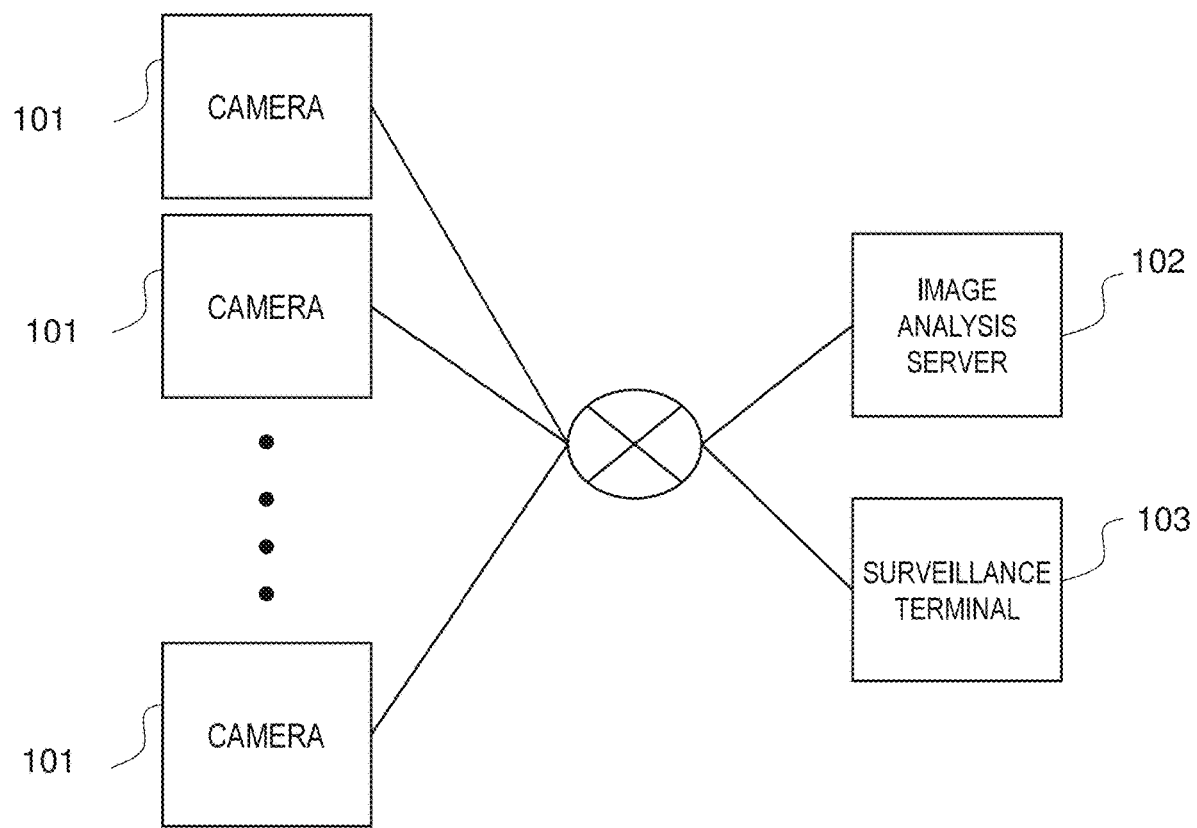
FIG. 1 is an entire block diagram of a surveillance system according to a first exemplary embodiment.

The present disclosure, therefore, has been made in view of such an issue and its object is to provide a surveillance device, a surveillance system, and a surveillance method capable of reliably detecting a deviation in an angle of view of a surveillance camera regardless of the presence or absence of a straight line portion in a surveillance area, easily adjusting a deviation amount of the angle of view, and continuously performing surveillance in a constant setting state.

A first aspect of the present disclosure is a surveillance device including a processor that generates an alarm when detecting an alarm generation target that has entered an intrusion detection area, based on a captured image captured by an imaging device. The processor acquires a basic image of the captured image, sets a basic area corresponding to a fixed object included in the basic image, acquires a live image of the captured image, extracts a reference area corresponding to a fixed object included in the live image, calculates a deviation amount of an angle of view based on a result of a comparison in standard position between the basic area and the reference area, and generates and displays a surveillance screen including an angle-of-view adjustment screen for guidance on an operation for cancelling the deviation amount of the angle of view.

This makes it possible to reliably detect a deviation in an angle of view of a surveillance camera regardless of the presence or absence of a straight line portion in a surveillance area, easily adjust a deviation amount of the angle of view, and continuously perform surveillance in a constant setting state.

Further, in a second aspect of the present disclosure, the basic area is set based on an outline of the fixed object.

Accordingly, since a candidate frame based on the outline of the fixed object is displayed, a user can set the basic area reliably including the entire fixed object.

In a third aspect of the present disclosure, the processor interposes an absolute position of the intrusion detection area in the comparison in standard position between the basic area and the reference area.

With this configuration, the processor compares a distance between the absolute position where no shift occurs in the intrusion detection area and the standard position of the basic area with a distance between the absolute position and the standard position of the reference area. This makes it possible to reliably detect the deviation in the angle of view of the surveillance camera.

In a fourth aspect of the present disclosure, the processor presents a plurality of candidate basic areas that are candidates for the basic area, and sets the basic area based on an operation by a user for selecting any of the plurality of candidate basic areas.

As a result, since the processor displays the plurality of candidate frames based on the outline of the automatically detected fixed object, the user can quickly check the fixed object in the surveillance area and simply set the basic area.

In a fifth aspect of the present disclosure, the angle-of-view adjustment screen includes a parameter relating to an orientation of the imaging device, and the deviation amount of the angle of view is cancelled based on an operation by a user for adjusting the parameter.

Accordingly, since the parameter (pan, tilt, etc.) related to the orientation of the surveillance camera is displayed on the angle-of-view adjustment screen, the user can easily and quickly adjust the deviation amount of the angle of view of the surveillance camera through adjustment of the displayed parameter.

In a sixth aspect of the present disclosure, the angle-of-view adjustment screen includes a display portion indicating the live image, and a superimposing button for superimposing at least one of the intrusion detection area and the basic area on the live image.

Accordingly, since at least one of the intrusion detection area and the basic area is superimposed on the live image, the user can intuitively check how much the angle of view deviates.

Further, in a seventh aspect of the present disclosure, the angle-of-view adjustment screen further includes a redisplay button to be used for checking whether a deviation occurs between the reference area where a parameter adjustment operation has been performed and the basic area.

Therefore, the user can intuitively and easily check a correction state of the deviation in the angle of view through checking the superimposing state between the basic area displayed on the angle-of-view adjustment screen and the reference area where the parameter adjustment operation has been performed.

In an eighth aspect of the present disclosure, the parameter includes installation date and time of the imaging device, a name of the imaging device, an IP address, pan, tilt, or zoom as a parameter item.

Accordingly, since information about relating to the installation date and time of the surveillance camera, a name of the surveillance camera, an IP address, pan, tilt, or zoom is displayed on the angle-of-view adjustment screen, the user can easily check the installation state or the like of the surveillance camera without requiring a complicated operation.

In a ninth aspect of the present disclosure, the angle-of-view adjustment screen indicates a parameter item that causes the deviation amount of the angle of view in a highlighted display method that is different from a method for displaying other parameter items.

Accordingly, since the parameter item of the surveillance camera that causes the deviation in the angle of view is displayed in the method different from the method for displaying the other parameter items, the user can easily and quickly understand an abnormal parameter of the surveillance camera.

In a tenth aspect of the present disclosure, the surveillance screen includes a screen switching tab that enables switching between various setting screens and the angle-of-view adjustment screen.

Accordingly, since the display of the surveillance screen can be switched to any screen, the user can check, correct, or change the basic area at desired timing.

In an eleventh aspect of the present disclosure, the processor calculates a difference between a luminance distribution of the basic image and a luminance distribution of the live image to determine whether an abnormality has occurred in the imaging device, and notifies the user that a failure has occurred when determining that the abnormality has occurred.

As a result, since the processor notifies the user that the surveillance camera is defected, the user can quickly replace the surveillance camera. This enables the surveillance camera to appropriately perform the intrusion detection processing and the angle-of-view deviation detection processing.

In a twelfth aspect of the present disclosure, the processor uses an average value of a luminance signal as the luminance distribution, to calculate a change amount of the average value of the luminance signal of the basic image, and notify the user that a failure has occurred in the imaging device when the change amount exceeds a predetermined threshold.

As a result, the failure of the surveillance camera can be efficiently detected, and thus a burden of the visual check made by the user can be reduced.

A thirteenth aspect of the present disclosure is a surveillance system that generates an alarm when detecting an alarm generation target that has entered an intrusion detection area, based on a captured image. The surveillance system includes a plurality of imaging devices, a server device that is connected with the plurality of imaging devices via a network, and a surveillance terminal that receives an alarm generated from the server device via the network. The server devices acquires a basic image of the captured image to set a basic area corresponding to a fixed object included in the basic image, acquires a live image of the captured image to extract a reference area corresponding to a fixed object included in the live image, calculates a deviation amount of an angle of view based on a result of a comparison in standard position between the basic area and the reference area, and generates a surveillance screen including an angle-of-view adjustment screen for guidance on an operation for cancelling the deviation amount of the angle of view to transmit the surveillance screen to the surveillance terminal.

This makes it possible to continue the surveillance in a constant state as in the first aspect.

In a fourteenth aspect of the present disclosure, the surveillance terminal includes a mobile terminal including a display screen that indicates information transmitted from the server device.

Accordingly, the user can promptly check the occurrence of the deviation in the angle of view not only in the specific area but also in any place.

In a fifteenth aspect of the present disclosure, when detecting a deviation in an angle of view in at least one of the plurality of imaging devices, the server device transmits a list screen where the live images of the plurality of imaging devices installed in a predetermined area checked, to the surveillance terminal.

As a result, since the live images of the plurality of surveillance cameras installed in the predetermined area are displayed in a list, the user can easily check the capturing states of the plurality of surveillance cameras, and can intuitively keep track of a surveillance camera in which the deviation in the angle of view has occurred.

In a sixteenth aspect of the present disclosure, the server device transmits, based on an operation by a user for selecting any live image from the plurality of the live images displayed on the list screen, a viewer screen of an imaging device corresponding to the selected live image among the plurality of imaging devices.

Accordingly, when selecting a live image of any surveillance camera from the live images of the plurality of surveillance cameras, the user can easily and quickly check a setting state or the like of any surveillance camera.

In a seventeenth aspect of the present disclosure, the server device transmits the viewer screen including the live image of the imaging device selected among the plurality of the live images of the plurality of imaging devices by the user, the basic image of the imaging device, the parameter of the imaging device, or a comment that notifies that a deviation in an angle of view has occurred in the imaging device.

As a result, since the live image and the basic image of any surveillance camera are displayed on the viewer screen, the user can intuitively keep tracks of the deviation in the angle of view. In addition, when the server device detects the deviation in the angle of view, the comment notifying that the deviation in the angle of view has occurred is also displayed on the viewer screen. Thus, the user can avoid a state that the deviation in the angle of view is not properly corrected.

An eighteenth aspect of the present disclosure is a surveillance method for causing a processor to perform alarm generation processing when an alarm generation target that has entered an intrusion detection area is detected based on a captured image captured by an imaging device. The method includes causing the processor to acquire a basic image of the captured image to set a basic area corresponding to a fixed object included in the basic image, acquire a live image of the captured image to extract a reference area corresponding to a fixed object included in the live image, calculate a deviation amount of an angle of view based on a result of a comparison in standard position between the basic area and the reference area, and generate and display a surveillance screen including an angle-of-view adjustment screen for guiding an operation for cancelling the deviation amount of the angle of view.

This makes it possible to continue the surveillance in a constant state as in the first aspect.

Hereinafter, exemplary embodiments of the present disclosure are described with reference to drawings. Note that the exemplary embodiments disclosed below are all examples, and are not intended to limit the surveillance device and the surveillance system of the present disclosure.

First Exemplary Embodiment

FIG. 1 is an entire block diagram of a surveillance system according to a first exemplary embodiment.

The surveillance system normally detects a person who appears in an intrusion detection area as an alarm generation target using an image recognition model (machine learning model) constructed by machine learning such as deep learning, based on a captured image captured by an imaging device, and generates an alarm when detecting the alarm generation target that has entered the intrusion detection area. The detection of the alarm generation target is not limited to the case where the entire body of the person appears in the intrusion detection area, and may be detected when a part of the body appears in the intrusion detection area. The detection may be performed based on a posture (for example, falling down) or a state (for example, a body temperature or a heart rate) of a person to be as the alarm generation target.

In addition to the normal function described above, the surveillance system according to the first exemplary embodiment detects a deviation in an angle of view of the imaging device based on the captured image captured by the imaging device and notifies a surveillance staff (user) about the detection. This surveillance system includes a plurality of cameras 101 (imaging devices), image analysis server 102 (angle-of-view deviation detection device), and surveillance terminal 103 (notification device). Cameras 101, image analysis server 102, and surveillance terminal 103 are connected to each other via a network.

Cameras 101 are installed respectively for predetermined surveillance areas indoors and outdoors. Each camera 101 captures, as a surveillance area, an intrusion detection area where intrusion of an alarm generation target such as a person or an animal is detected, and a fixed object installed near the intrusion detection area. Each camera 101 transmits the camera image obtained by imaging the surveillance area to image analysis server 102 via the network.

Image analysis server 102 is installed in a device room of a store, a data center, or the like where camera 101 is installed. Image analysis server 102 acquires a camera image of the surveillance area from camera 101 and compares the acquired camera image with a basic image of the surveillance area preregistered in the server, thereby performing processing for detecting a deviation in an angle of view of camera 101 (angle-of-view deviation detection processing). Further, when detecting the deviation in the angle of view, image analysis server 102 notifies a user about the detection result. Specifically, surveillance terminal 103 is instructed to perform a predetermined notification operation. Image analysis server 102 includes a processor (central processing unit [CPU]) and a program memory. Each unit of image analysis server 102 is achieved by causing the CPU of image analysis server 102 to execute a monitoring program (instruction). A function of image analysis server 102 may be implemented by a cloud computer.

Surveillance terminal 103 is installed in an office of a store or the like where camera 101 is installed. Surveillance terminal 103 can be implemented, for example, by installing an application for detecting a deviation in an angle of view in a personal computer (PC). In response to an instruction from image analysis server 102, surveillance terminal 103 displays a notification screen as a notification operation for notifying an employee (user) of a store or the like that the deviation in angle of view has occurred. Surveillance terminal 103 may be a mobile terminal such as a smartphone or a tablet terminal. In the mobile terminal, display of the notification screen, output of an alarm sound, and generation of vibration are caused as the notification operation for notifying the user that a deviation in an angle of view has occurred.

Note that, in the present exemplary embodiment, a deviation in an angle of view of camera 101 installed indoors such as a store is detected and notified to a staff, but the installation location of camera 101 is not limited to indoors. For example, a deviation in an angle of view of camera 101 installed outdoors such as an amusement park may be detected and notified to a staff (user).

Figure 2:
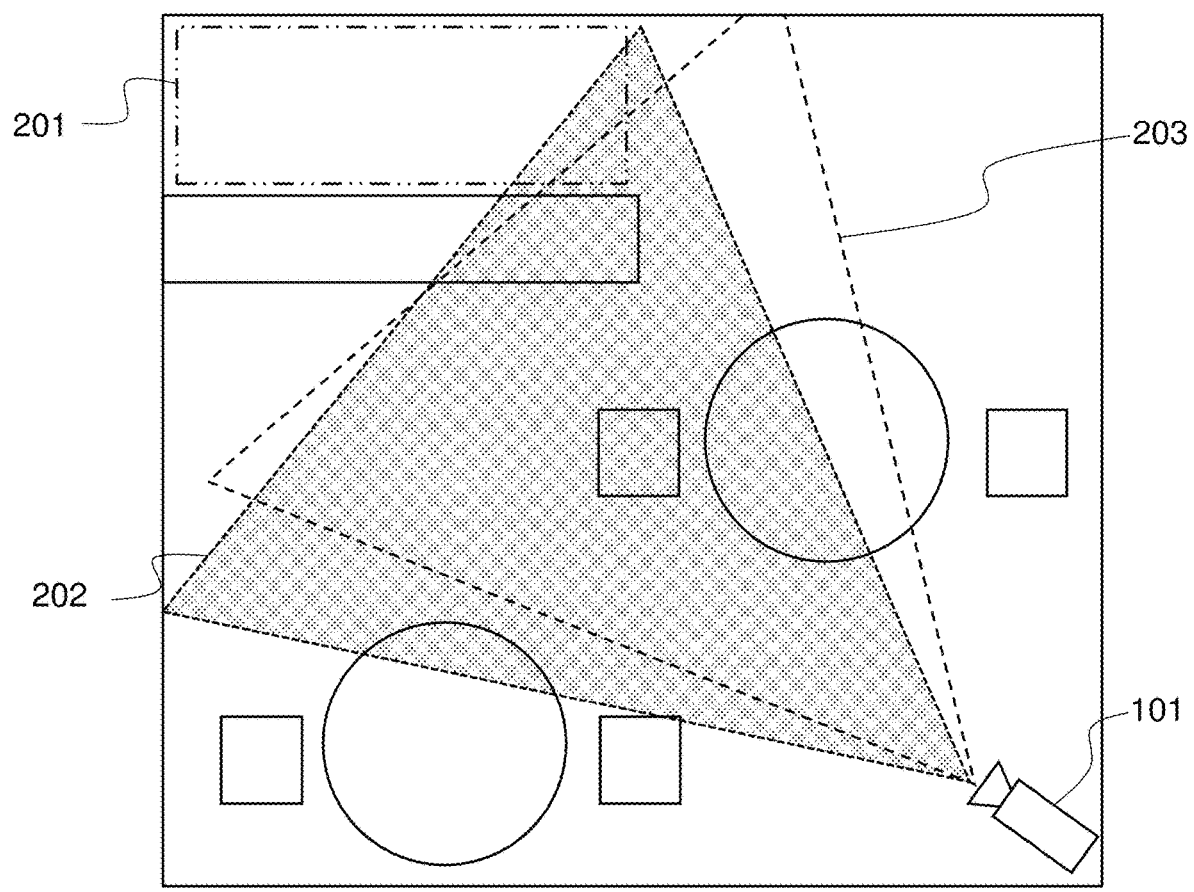
FIG. 2 is an explanatory diagram illustrating a capturing state of a camera.
Figure 3:
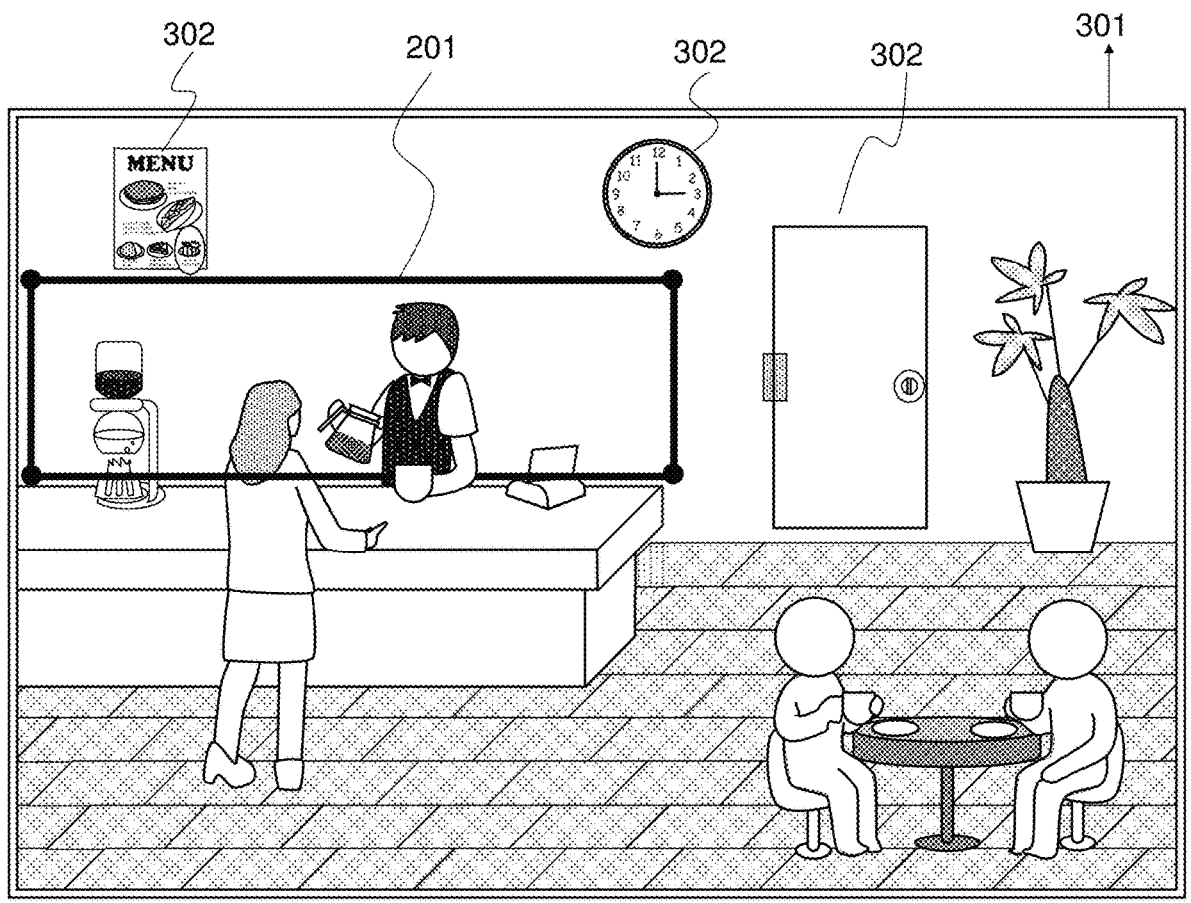
FIG. 3 is an illustration of an intrusion detection area set on a camera image.
Figure 4:
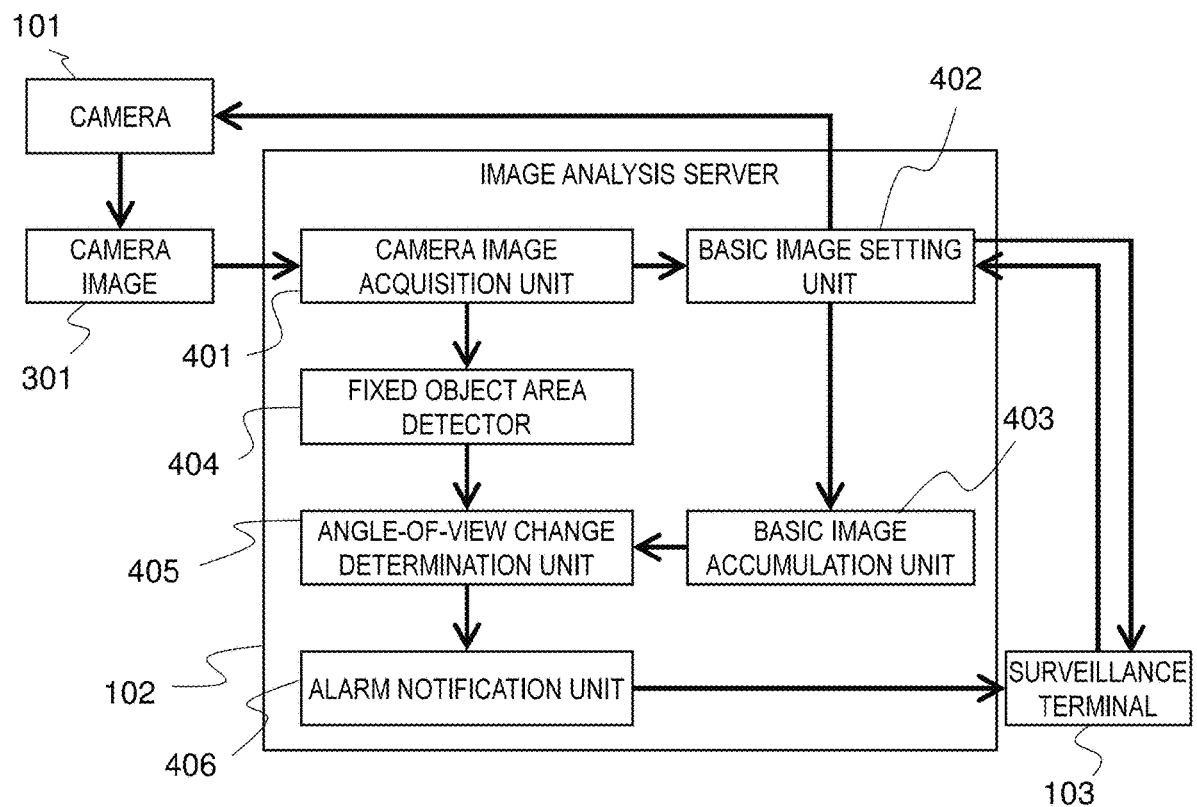
FIG. 4 is an explanatory diagram illustrating an outline of angle-of-view deviation detection processing.

Then, angle-of-view deviation detection processing to be performed by image analysis server 102 according to the first exemplary embodiment will be described. FIG. 2 is an explanatory diagram illustrating a capturing state of a camera. FIG. 3 is an explanatory diagram illustrating an intrusion detection area set on a camera image. FIG. 4 is an explanatory diagram illustrating an outline of the angle-of-view deviation detection processing.

As illustrated in FIG. 2, camera 101 captures, as a surveillance area, indoor intrusion detection area 201 and a fixed object installed near intrusion detection area 201. The plurality of cameras 101 may be installed to capture an entire indoor area without omission. Thus, blind spots in the angle-of-view deviation detection processing is eliminated, and the omission of detection is prevented.

The angle of view of camera 101 may be deviated due to various causes. For example, when camera 101 having a pan-tilt function performs an erroneous operation, the angle of view of camera 101 might be deviated. Further, when an operator comes in contact with camera 101 at the time of cleaning, inspection, or the like, the angle of view of camera 101 might be deviated.

In the present exemplary embodiment, the angle of view of camera 101 represents a range of an object to be actually captured by camera 101, and relates to an orientation (attitude) of camera 101 as a capturing condition. Further, in camera 101 having a zoom function, the angle of view includes a zoom factor as the capturing condition, that is, the width of the capturing range centered on an optical axis of a lens.

Incidentally, the intrusion detection processing is performed by using an image recognition model (machine learning model). When the angle of view of camera 101 deviates, the capturing range of camera 101 changes from angle of view 202 at the time of installation of the camera to angle of view 203 at the time of occurrence of a deviation in an angle of view. Therefore, an object set on the camera image shifts, and the accuracy of detecting an alarm generation target that enters intrusion detection area 201 is degraded. In order to improve the accuracy, a technician needs to readjust the parameters of the image recognition model or to collect learning data over time and again learn the data. However, such a method takes a lot of time and effort, and an adjustment burden is great.

Therefore, in the present exemplary embodiment, as illustrated in FIG. 3, image analysis server 102 acquires camera image 301 in which intrusion detection area 201 and fixed object 302 installed near intrusion detection area 201 are included in the capturing region. Subsequently, image analysis server 102 performs processing for detecting a deviation in an angle of view of camera 101 installed indoors (angle-of-view deviation detection processing), based on camera image 301, and notifies the user that the deviation in the angle of view has occurred via surveillance terminal 103. The user corrects the deviation in the angle of view of camera 101 via surveillance terminal 103 based on the information notified from image analysis server 102. The correction of the deviation in the angle of view may be made by the user himself/herself or may be automatically made by the system according to the present exemplary embodiment.

Specifically, as illustrated in FIG. 4, the angle-of-view deviation detection processing is performed in image analysis server 102. In order to perform the angle-of-view deviation detection processing, image analysis server 102 performs processing for setting a basic image to be compared with the live images of the surveillance area sent from camera 101 at regular time intervals (basic image registration processing).

Camera image acquisition unit 401 provided in image analysis server 102 acquires camera image 301 from camera 101. Camera image acquisition unit 401 transmits acquired camera image 301 to basic image setting unit 402. After acquiring camera image 301, in response to an operation by the user via surveillance terminal 103, basic image setting unit 402 sets the basic image based on camera image 301. After setting the basic image, basic image setting unit 402 transmits the basic image to basic image accumulation unit 403. Basic image accumulation unit 403 stores the acquired basic image as a target to be compared with the live images of the surveillance area sent from camera 101 at regular time intervals. Note that basic image accumulation unit 403 may be disposed outside image analysis server 102, and for example, a memory (not illustrated) disposed in camera 101 can be used as basic image accumulation unit 403.

After the basic image registration processing, image analysis server 102 acquires camera images 301 from camera 101 at regular time intervals. Camera image acquisition unit 401 transmits acquired camera images 301 to fixed object area detector 404 disposed in image analysis server 102. After acquiring camera images 301, fixed object area detector 404 detects a fixed object area included in each camera images 301. Here, the fixed object included in the camera image 301 can be recognized by using a known object recognition technique employing deep learning. Then, after detecting the fixed object areas corresponding to the recognized fixed object, image analysis server 102 causes angle-of-view change determination unit 405 to compare center coordinates or coordinates of vertexes of the fixed object area detected from camera image 301 with center coordinates or coordinates of vertexes of the fixed object area set in the basic image registration processing, and determines whether a deviation in an angle of view has occurs. Based on the determination result of the angle-of-view change determination unit, image analysis server 102 notifies the user about the occurrence of the deviation in the angle of view and a deviation degree of the angle of view (movement coordinates) via surveillance terminal 103.

The user can check the deviation degree of the angle of view in camera 101 via surveillance terminal 103. After checking the deviation degree of the angle of view, the user can correct the deviation in the angle of view of camera 101 in basic image setting unit 402 via surveillance terminal 103. The user can then update corrected camera image 301 as the basic image in basic image accumulation unit 403 through processing for registering corrected camera image 301. Here, since the updated basic image is reproduced to be equivalent to the basic image before the occurrence of the deviation in the angle of view, an alarm generation target that has appeared in the intrusion detection area can be detected by continuously using the image recognition model (machine learning model) constructed by machine learning such as deep learning.

As a result, even when a deviation in an angle of view occurs in camera 101, the user can quickly correct the deviation in the angle of view of camera 101 without readjusting or relearning the parameters of the image recognition model. This enables the accurate determination of the intrusion detection using the image recognition model.

Then, angle-of-view deviation detection processing to be performed by image analysis server 102 according to the first exemplary embodiment will be described.

Figure 5:
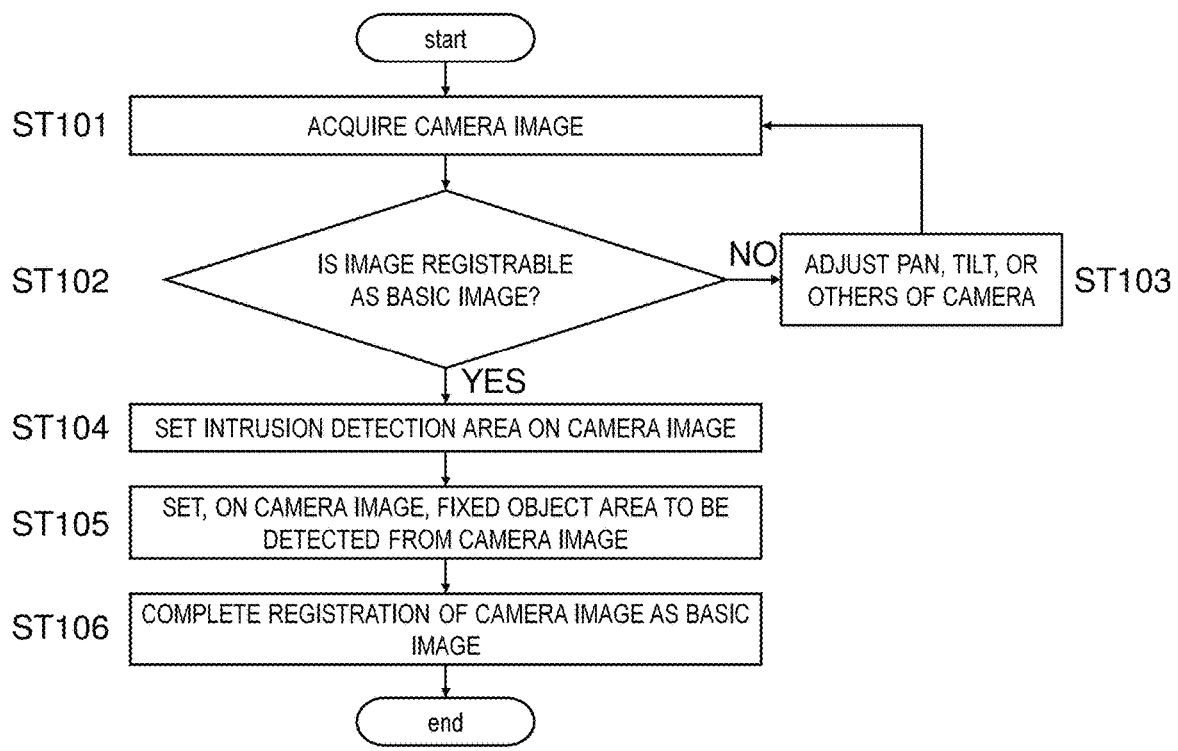
FIG. 5 is a flowchart illustrating a procedure of basic image registration processing which is preprocessing in the angle-of-view deviation detection processing.

In the present exemplary embodiment, in order to perform the angle-of-view deviation detection processing, a basic image to be compared with camera images 301 of the surveillance area sent from camera 101 at regular time intervals need to be set. FIG. 5 is a flowchart illustrating a procedure of the basic image registration processing that is preprocessing in the angle-of-view deviation detection processing.

Basic image setting registration is performed by the user via surveillance terminal 103. At the time of basic image registration, in surveillance terminal 103, basic setting screen 601 as illustrated in FIG. 6 is displayed as a user operation screen.

Basic setting screen 601 includes live image display portion 602. Camera image 301 of the surveillance area captured by camera 101 is displayed on live image display portion 602. Image analysis server 102 acquires camera image 301 from camera 101, and displays camera image 301 to the user via surveillance terminal 103. (ST101)

Next, the user checks camera image 301 displayed on live image display portion 602, and determines whether camera image 301 can be registered as the basic image. (ST102)

Figure 6:
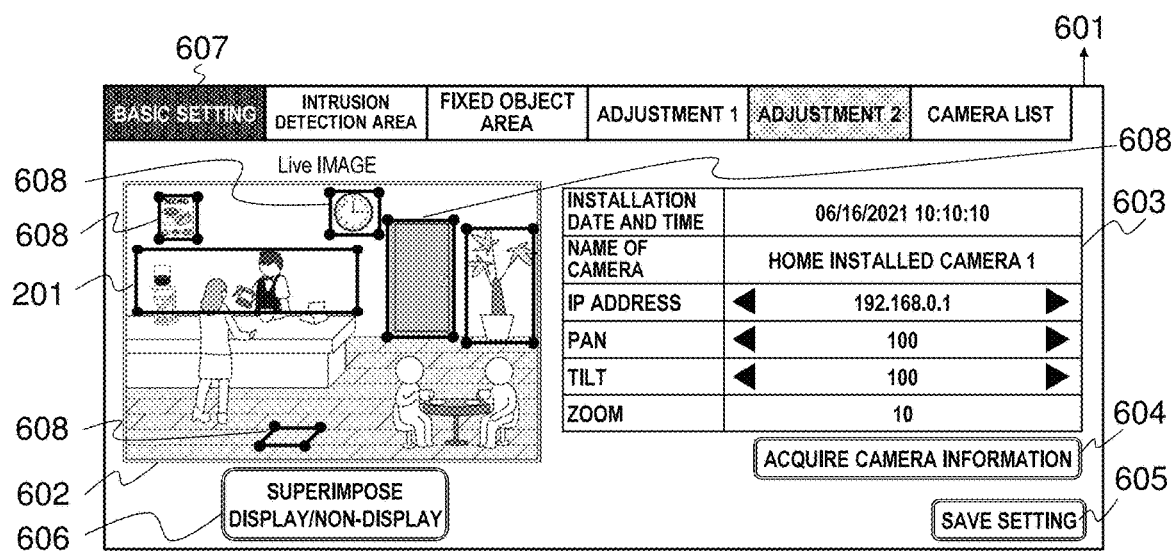
FIG. 6 is an explanatory diagram illustrating a basic setting screen.

In FIG. 6, basic setting screen 601 has camera information acquisition button 604. The user can acquire camera parameters 603 through pressing camera information acquisition button 604. Camera parameter 603 includes information such as installation date and time of camera 101, a name of camera 101, an IP address, pan, tilt, and zoom.

When the user determines that camera image 301 is not appropriate to be registered as the basic image, the user can adjust the pan, tilt or the like of camera 101 through adjustment of camera parameter 603. (ST103)

In ST103, after the adjustment of the pan, tilt, or the like of camera 101, image analysis server 102 acquires camera image 301 obtained after the parameter adjustment of camera 101. Thus, the user again do the work in ST102. Note that the operations in ST101 to ST103 can be repeatedly performed until the user determines that the image acquired from camera 101 is appropriate to be registration as the basic image.

When camera image 301 is worth registering as the basic image, the user can save camera image 301 as the basic image in association with camera parameter 603 through pressing of setting save button 605 provided on basic setting screen 601.

Basic setting screen 601 further includes superimposing button 606. The user can superimpose a frame image corresponding to at least one of intrusion detection area 201 and fixed object area 608 (basic area) on camera image 301 displayed on live image display portion 602 through pressing of superimposing button 606. Setting of intrusion detection area 201 and fixed object area 608 will be described later.

Figure 7:
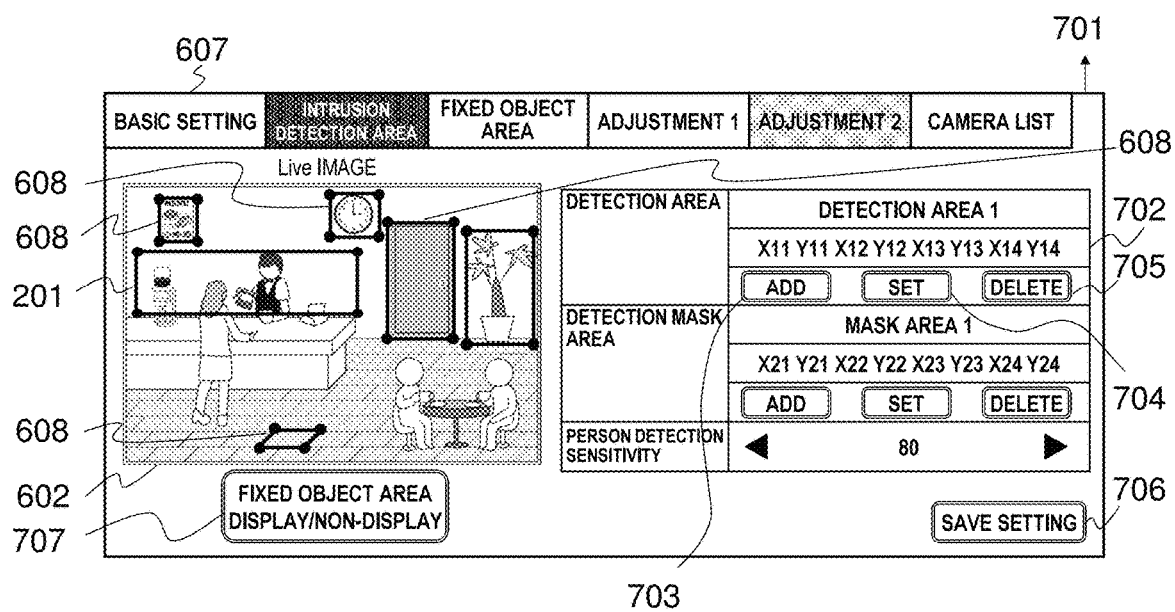
FIG. 7 is an explanatory diagram illustrating an intrusion detection area setting screen.

The user can switch the screen to a screen desired to be displayed by the user on surveillance terminal 103 through pressing of screen switching tabs 607 provided on basic setting screen 601. For example, when the user presses a tab of the intrusion detection area of screen switching tab 607, the screen is switched to intrusion detection area setting screen 701 as illustrated in FIG. 7. When the user presses setting save button 605 while basic setting screen 601 is displayed, the screen of surveillance terminal 103 may be automatically switched to intrusion detection area setting screen 701.

Intrusion detection area setting screen 701 includes live image display portion 602. The basic image registered on basic setting screen 601 is displayed on live image display portion 602.

On intrusion detection area setting screen 701, the user can set intrusion detection area 201 for detecting an alarm generation target such as a person or an animal on the basic image displayed on live image display portion 602. (ST104)

The user can set intrusion detection area 201 through an operation on intrusion detection area setting portion 702 provided on detection area setting screen 701. Specifically, after pressing addition button 703 provided in a field of intrusion detection area of intrusion detection area setting portion 702, the user can set rectangular intrusion detection area 201 through pressing of the basic image displayed on live image display portion 602 and setting of any four points. Note that a method of setting intrusion detection area 201 is not limited to a method with which the user sets any four points on the basic image, and various methods can be used. The shape of intrusion detection area 201 may be an ellipse, a star, or the like, and is not limited to a rectangle. Further, a plurality of intrusion detection areas 201 may be set.

When the user desires to complete the setting of intrusion detection area 201, the user can complete the setting of intrusion detection area 201 through pressing of setting button 704 provided in the field of intrusion detection area on intrusion detection area setting portion 702. Further, when the user desires to delete set intrusion detection area 201, the user can delete intrusion detection area 201 that has been set through pressing of deletion button 705 provided in the field of intrusion detection area on intrusion detection area setting portion 702.

The user can set a detection mask area through an operation on intrusion detection area setting portion 702. In the present exemplary embodiment, the detection mask area is a region that is in intrusion detection area 201 but is not subjected to detection processing. As an example of the detection mask area, in a case where a poster or the like on which an alarm generation target appears is present in intrusion detection area 201, an area of the poster or the like is excluded from the detection processing area.

When the user operates intrusion detection area setting portion 702 to finish the setting of intrusion detection area 201, the detection mask area, and a person detection sensitivity, the user can save the setting state of intrusion detection area 201 and the like in association with the basic image displayed on live image display portion 602 through pressing of setting save button 706 provided on intrusion detection area setting screen 701. Since authorized people of a store who frequently go in and out of intrusion detection area 201 have to be excluded from the alarm generation target, machine learning data or the like that is excluded from the alarm generation target may be added.

Further, intrusion detection area setting screen 701 includes fixed object area superimposing button 707. The user can superimpose a frame image corresponding to fixed object area 608 on camera image 301 displayed on live image display portion 602 through pressing of fixed object area superimposing button 707. Setting of fixed object area 608 will be described later.

Figure 8:
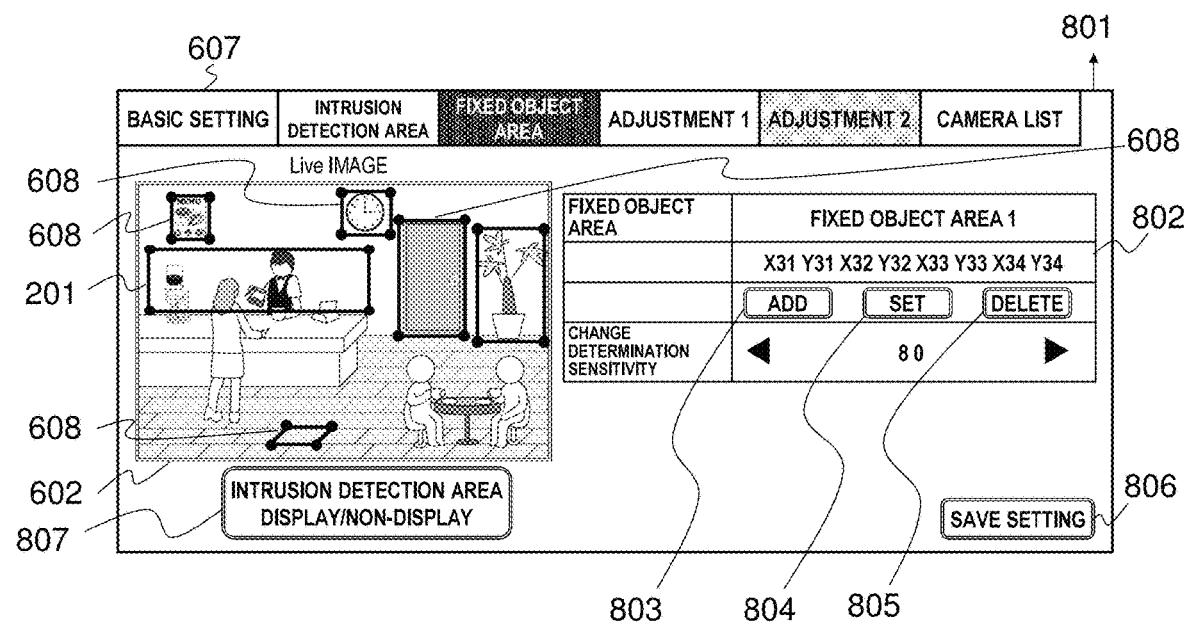
FIG. 8 is an explanatory diagram illustrating a fixed object area setting screen.

The user can switch the screen to a screen desired to be displayed by the user on surveillance terminal 103 through pressing of screen switching tab 607 provided on intrusion detection area setting screen 701. For example, when the user presses a tab of the fixed object area, the screen is switched to angle-of-view fixed object area setting screen 801 as illustrated in FIG. 8. When the user presses setting save button 706 while intrusion detection area setting screen 701 is displayed, the screen of surveillance terminal 103 may be automatically switched to fixed object area setting screen 801.

Fixed object area setting screen 801 includes live image display portion 602. The basic image registered on basic setting screen 601 is displayed on live image display portion 602.

On fixed object area setting screen 801, the user can set, on the basic image displayed on live image display portion 602, fixed object area 608 indicating an area of a clock, a door, a tile of a floor, or the like installed in the surveillance area. (ST105)

Fixed object area 608 can be set by operating fixed object area setting portion 802 provided on fixed object area setting screen 801. Specifically, addition button 803 provided in the field of the fixed object area of fixed object area setting portion 802 is pressed, and an operation similar to that at the time of setting intrusion detection area 201 is performed. Thus, the fixed object area 608 can be set. The method for setting fixed object area 608 is not limited to the method with which the user sets any four points. Thus, candidate frames based on an outline of the fixed object automatically detected by image analysis server 102 may be displayed, and are automatically selected in order of being closer to intrusion detection area 201, or any frame may be selected among the candidate frames and set by the user. The outline of the fixed object may be a figure using a rectangle, a polygon, or a curve. Further, the candidate frames are assumed to be frames including the outline of the fixed object.

When the user determines that the setting of fixed object area 608 is completed, the user can complete the setting of fixed object area 608 through pressing of setting button 804 provided in the field of the fixed object area on fixed object area setting portion 802. Further, when the user desires to delete set fixed object area 608, the user can delete the setting of fixed object area 608 that has been set through pressing of deletion button 805 provided in the field of fixed object area on fixed object area setting portion 802. Note that a movable object (flower pot and the like) appearing on the live image are excluded from fixed object area 608 in user's determination.

The user can further select a plurality of fixed objects from the basic image, and can select three or more fixed objects. The number of fixed objects to be selected may be one, but an erroneous detection can be reduced by selecting a plurality of fixed objects and acquiring a deviation amount of an angle of view in multiple viewpoints.

When the user completes the setting of fixed object area 608, the user can save setting state of a detection area or the like in association with the basic image through pressing of setting save button 806 provided on fixed object area setting screen 801.

Fixed object area setting screen 801 further includes intrusion detection area superimposing button 807. The user can superimpose a frame image corresponding to intrusion detection area 201 on camera image 301 displayed on live image display portion 602 through pressing of intrusion detection area superimposing button 807.

As described above, when the user performs the processing in ST102 to ST105, the registration of the basic image used for the angle-of-view deviation detection processing is completed. (ST106)

As illustrated in FIGS. 6, 7, and 8, the user can switch the screen to a screen desired to be displayed by the user on surveillance terminal 103 through pressing of screen switching tab 607 provided on various setting screens including basic setting screen 601, intrusion detection area setting screen 701, and fixed object area setting screen 801. This enables the user to correct or change the basic image at any desired timing.

In the present exemplary embodiment, the processing in ST105 is performed after the processing in ST104, but the order of the steps is not limited thereto, and the steps may be changed.

Figure 9:
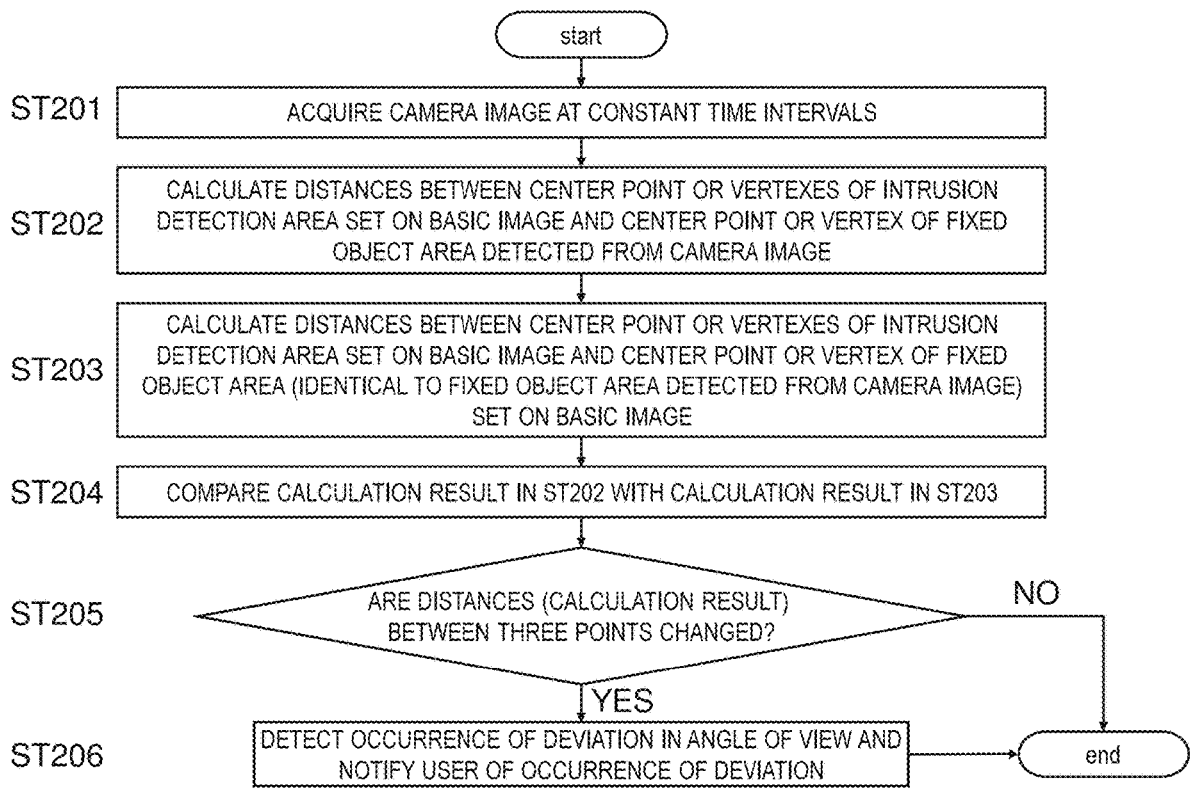
FIG. 9 is a flowchart illustrating a procedure of angle-of-view deviation alarming processing after basic image registration.

Then, the angle-of-view deviation detection processing performed by using the basic image registered in the basic image registration processing will be described. FIG. 9 is a flowchart illustrating a procedure of angle-of-view deviation notification processing after basic image registration.

Specifically, the angle-of-view deviation detection processing after the basic image registration is performed in image analysis server 102. Image analysis server 102 acquires camera images 301 of the surveillance area captured by camera 101 at regular time intervals. (ST201)

Image analysis server 102 detects a plurality of (for example, three) fixed object areas 608' (reference areas) from acquired camera images 301, and calculates a distance between a center point or each vertex of the intrusion detection area set in the basic image and a center point or a vertex of detected fixed object area 608'. (ST202)

Although the plurality of fixed object areas 608' is detected, the number of fixed object areas 608' is not limited thereto, and it may be one. Further, presence or absence of hiding of each vertex of fixed object area 608 may be determined by detecting a person or a load moving in the surveillance region, and the center point and the vertex of hidden fixed object area 608 may not be used for calculating a distance.

After ST202, image analysis server 102 calculates a distance between a center point or each vertex of intrusion detection area 201 set on the basic image and the center point or the vertex of fixed object area 608 set on the basic image. (ST203)

As the fixed object selected at the time of calculation in ST203, the fixed object identical to the fixed object detected from camera image 301 at the time of calculation in ST202 is selected by known object recognition identification processing.

Figure 10A:
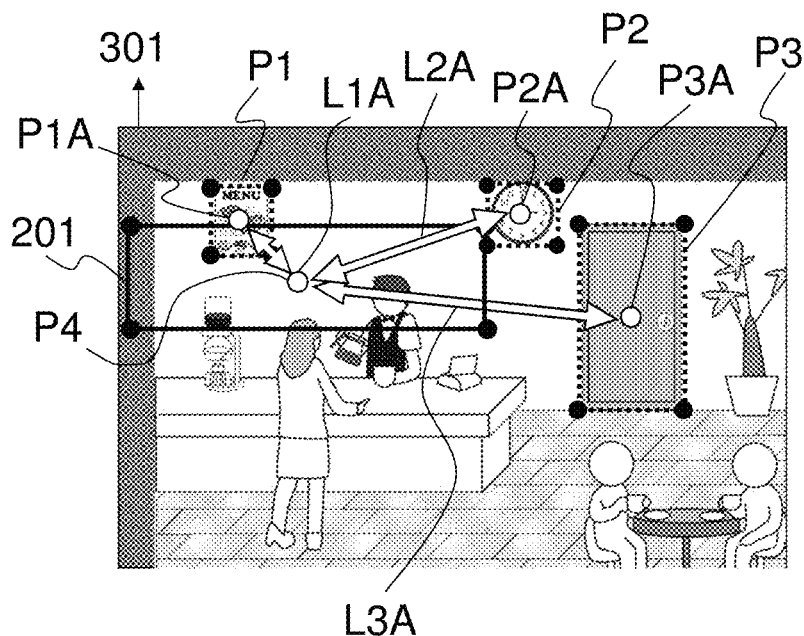
FIGS. 10A and 10B are schematic diagrams in a case where a standard point is a center point of an intrusion detection area and reference points are center points of fixed object areas.
Figure 10B:
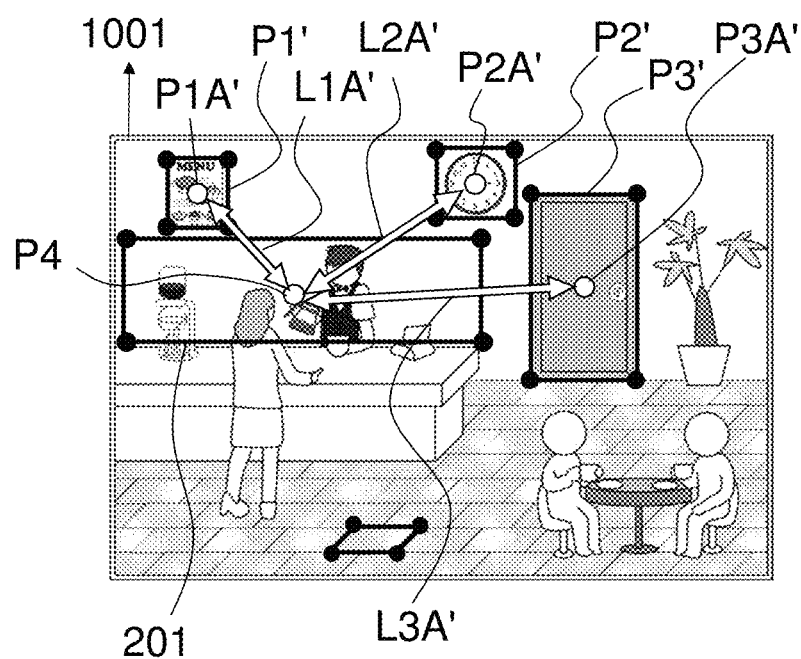

Here, a method for determining whether a deviation in an angle of view occurs will be described. In the present exemplary embodiment, distances between a center point (P4) of intrusion detection area 201 commonly set in the basic image and the live image and center points of a plurality of (here, three) fixed object areas 608 are calculated, and a change in the distances is detected. In such a manner, a detection is made whether a deviation in an angle of view has occurred. FIGS. 10A and 10B are schematic diagrams in a case where a standard point (absolute position) is the center point of the intrusion detection area and reference points (standard positions) are the center points of the fixed object areas respectively.

FIG. 10A illustrates camera image 301 (live image) acquired by image analysis server 102 from camera 101. Image analysis server 102 detects a plurality of (here, three) fixed object areas 608' (broken-line frames) from the camera image 301. Fixed object areas 608' (broken-line frames) may be detected by a method for selecting them in order of being closer to intrusion detection area 201.

After detecting the plurality of fixed object areas 608' (broken-line frames), image analysis server 102 sets a center point in each of fixed object areas 608' (broken-line frames). For example, when fixed object areas 608' (broken-line frames) are denoted by P1, P2, and P3, the center points of fixed object areas P1, P2, and P3 are set as P1A, P2A, and P3A, respectively.

Image analysis server 102 calculates the distances between the center points of fixed object areas 608' (broken-line frames) and the center point of intrusion detection area 201 set by the user in the basic image registration processing. Specifically, the center point of intrusion detection area 201 is denoted by P4, image analysis server 102 calculates distance L1A between P1A and P4, distance L2A between P2A and P4, and distance L3A between P3A and P4.

FIG. 10B illustrates basic image 1001 set and registered by the user in the basic image registration processing. In basic image 1001, intrusion detection area 201 and a plurality of fixed object areas 608 are set by the user in the basic image registration processing. The center points of fixed object areas 608 (solid line frame) are stored as reference points. For example, when the center point of intrusion detection area 201 is denoted by P4 and fixed object areas 608 (solid frames) are denoted by P1', P2', and P3', respectively, the center points of fixed object areas P1', P2', and P3' are stored as reference points, such as P1A', P2A', and P3A'.

Image analysis server 102 selects the same fixed object area 608'(broken-line frame) detected from camera image 301 from fixed object areas 608 (solid-line frames) set in the basic image registration processing, and calculates the distances between the center points of fixed object areas 608 (solid-line frames) and the center point of intrusion detection area 201. Specifically, image analysis server 102 calculates distance L1A' between P1A' and P4, distance L2A' between P2A' and P4, and distance L3A' between P3A' and P4.

Image analysis server 102 compares distances (L1A, L2A and L3A) between the three points calculated based on camera image 301 with distances (L1A', L2A' and L3A') between the three points calculated based on basic image 1001, thereby detecting a change in the distances between the three points and detecting whether a deviation in an angle of view occurs.

In the present exemplary embodiment, the three points are selected from the center points of fixed object areas 608 respectively, but three points may be selected from the vertexes of fixed object areas 608.

Figure 11A:
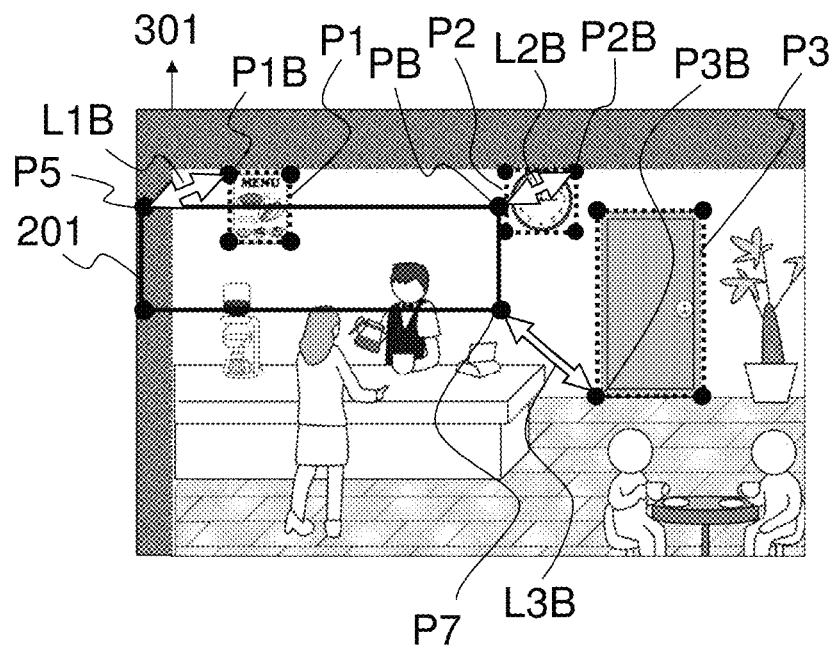
FIGS. 11A and 11B are schematic diagrams in a case of comparing positional relationships between the standard point of the intrusion detection area commonly set in a basic image and a live image and the reference points of the fixed object areas.
Figure 11B:
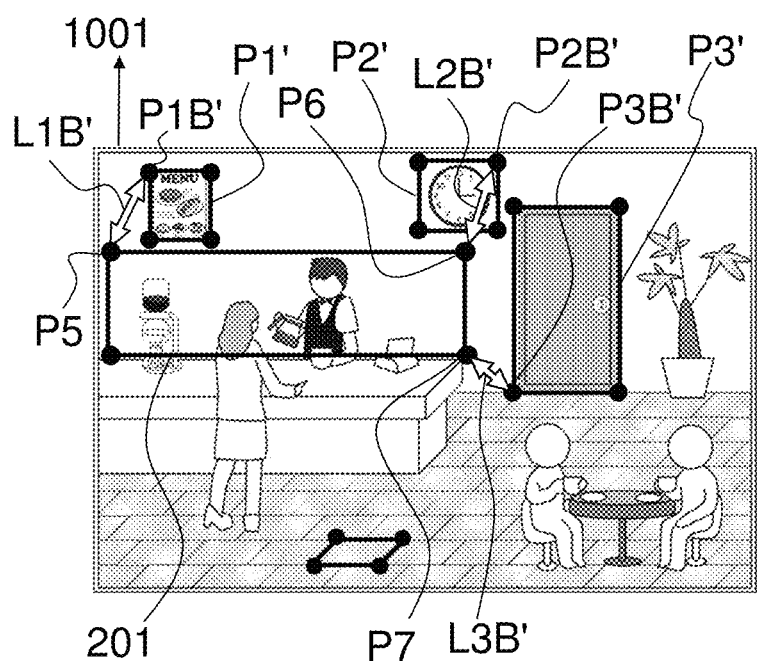

FIGS. 11A and 11B are schematic diagrams for comparing positional relationships between standard points (absolute positions) (P5 to P7) of the intrusion detection area and reference points (standard positions) of the fixed object area commonly set in basic image 1001 and in camera image 301 (live image).

FIG. 11A illustrates camera image 301 acquired by image analysis server 102 from camera 101. Image analysis server 102 detects at least one fixed object areas 608' (broken-line frame) from camera image 301. After detecting fixed object area 608' (broken-line frame), image analysis server 102 sets a vertex of fixed object area 608' (broken-line frame). For example, when fixed object areas 608' (broken-line frames) are denoted by P1, P2, and P3, the reference points of fixed object areas P1, P2, and P3 are set as P1B, P2B, and P3B, respectively.

In the present exemplary embodiment, the reference point is set by selecting from each of fixed object areas P1, P2, and P3, but three reference points may be set by selecting three points from one fixed object area. In addition, in a method for selecting each reference point, the reference points may be selected in order of being close to intrusion detection area 201.

Image analysis server 102 calculates the distances between the vertexes of fixed object areas 608' (broken-line frames) and the vertex of the intrusion detection area set by the user in the basic image registration processing. Specifically, the standard points of intrusion detection area 201 are denoted by P5, P6, and P7, and image analysis server 102 calculates distance L1B between P1B and P5, distance L2B between P2B and P6, and distance L3B between P3B and P7. In the present exemplary embodiment, the distances between the reference points of fixed object areas 608' (broken-line frames) and the standard points of intrusion detection area 201 are calculated. However, the distances may be the distances between the reference points of fixed object areas 608' (broken-line frames) and the center point of intrusion detection area 201.

FIG. 11B illustrates basic image 1001 set and registered by the user in the basic image registration processing. In basic image 1001, intrusion detection area 201 and the plurality of fixed object areas 608 (solid-line frames) are set by the user in the basic image registration processing. The vertexes of fixed object areas 608 (solid-line frames) are saved as reference points. For example, when the standard points of intrusion detection area 201 are denoted by P5, P6, and P7 and fixed object areas 608 (solid-line frames) are denoted by P1', P2', and P3', respectively, the reference points of fixed object areas P1', P2', and P3' are saved as P1B', P2B', and P3B'.

Image analysis server 102 selects a fixed object area identical to the fixed object area 608'(broken-line frame) detected on camera image 301 from fixed object areas 608 (solid-line frames) set in the basic image registration processing, and calculates the distances between the reference points of fixed object areas 608 (solid-line frames) and the standard points of intrusion detection area 201. Specifically, image analysis server 102 calculates distance L1B' between P1B' and P5, distance L2B' between P2B' and P6, and distance L3B' between P3B' and P7.

Image analysis server 102 compares distances (L1B, L2B, and L3B) between the three points calculated based on camera image 301 (live image) with distances (L1B', L2B', and L3B') between the three points calculated based on basic image 1001, thereby detecting a change in the distances between the three points and detecting whether a deviation in an angle of view has occurred.

Returning to FIG. 9, that is, image analysis server 102 compares the calculation result in ST202 with the calculation result in ST203 (ST204), and checks whether the distances (calculation result) between the selected three points has changed, thereby detecting whether a deviation in an angle of view has occurred. (ST205)

In the method for selecting the three points (the center points or the reference points of fixed object areas 608') in ST202 and ST203, the selection may be made depending on whether two or more fixed object areas 608' are detected.

When the distances (calculation results) between the selected three points has not changed, image analysis server 102 ends the angle-of-view deviation detection processing.

Next, when the distances (calculation results) between the selected three points has changed, image analysis server 102 detects the occurrence of a deviation in an angle of view and calculates the deviation amount of camera 101 based on the coordinates of fixed object area 608'. After calculating the deviation amount, image analysis server 102 notifies the user about the result via surveillance terminal 103. (ST206) When the change amount based on the comparison result of the three points is not constant, an average value of the change amount can be acquired or a representative value can be acquired from the approximate change amount to be reflected in the angle-of-view deviation detection processing.

In the present exemplary embodiment, the deviation in an angle of view is detected based on the result of the comparison between the reference point (standard position) of fixed object area 608 and the reference point (standard position) of fixed object area 608' with the standard point (absolute position) of intrusion detection area 201 interposed therebetween. However, the detection method is not limited thereto, and thus, the detection may be made whether the deviation in an angle of view has occurred by checking if the area of the superimposed portion between fixed object area 608 (basic area) and fixed object area 608' (reference area) described above exceeds a predetermined threshold.

Further, in the present exemplary embodiment, the deviation in an angle of view is detected with the standard point (absolute position) of intrusion detection area 201 being interposed, but the detection method is not limited thereto. Using the reference point of fixed area 608, which is set on basic image 1001, as the standard point (absolute position), the deviation in an angle of view may be detected based on a result of a comparison between the standard point of fixed area 608 and the reference point (standard position) of fixed area 608' detected on camera image 301.

In the notification processing, image analysis server 102 notifies the user about the result in the angle-of-view deviation notification processing via surveillance terminal 103. Specifically, surveillance terminal 103 is caused to perform a notification operation for notifying the user that the angle of view of camera 101 has deviated in camera 101.

Then, a notification screen displayed on surveillance terminal 103 according to the present exemplary embodiment will be described.

Figure 12:
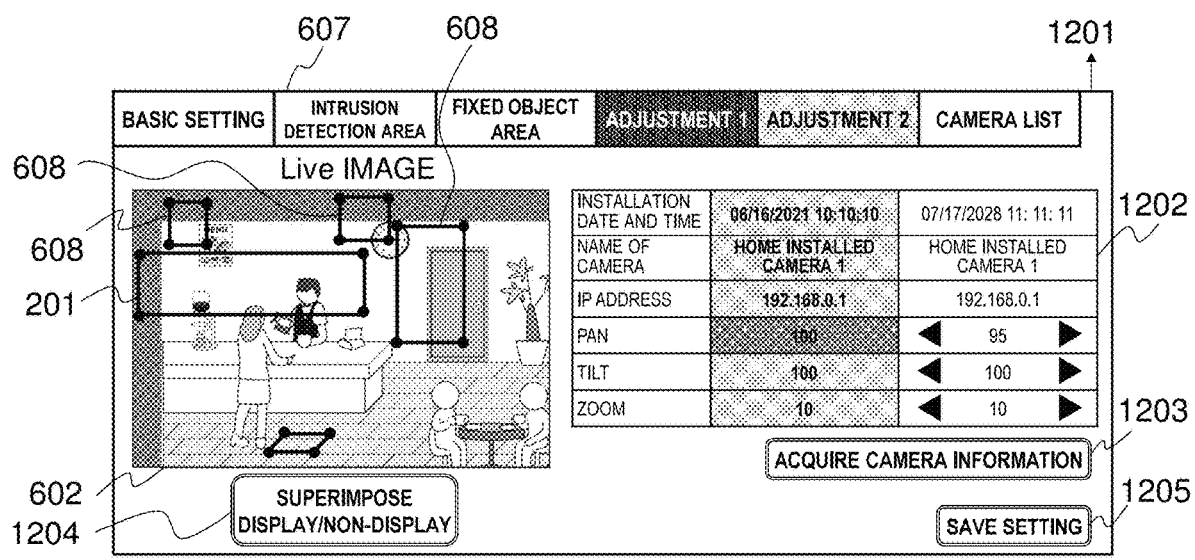
FIG. 12 is an explanatory diagram illustrating an adjustment 1 screen.

In response to an instruction from image analysis server 102, surveillance terminal 103 displays adjustment 1 screen 1201 as a notification operation for notifying the user that a deviation in an angle of view has occurred in camera 101 as illustrated in FIG. 12.

Adjustment 1 screen 1201 includes live image display portion 602. Live image display portion 602 indicates camera image 301 at timing of detecting the deviation in the angle of view in camera 101.

Further, adjustment 1 screen 1201 has camera parameter 1202. When the user presses camera information acquisition button 1203 provided on adjustment 1 screen 1201, camera parameter 1202 indicates the parameters of camera 101 at the time of detecting the deviation in the angle of view and the parameters of camera 101 at the time of registering the basic image. Camera parameter 1202 includes information such as installation date and time of camera 101, a name of camera 101, an IP address, pan, tilt, and zoom.

Since the parameter item of camera 101 that causes the deviation in the angle of view is displayed on camera parameter 1202 with its background color being red, the user can quickly understand an abnormal parameter of camera 101. In the present exemplary embodiment, the background color is changed, but the display method is not limited thereto, and other highlighted display such as shading, patterning, and blinking may be performed.

Further, since the set value of pan or tilt calculated from the deviation amount of camera 101 obtained in image analysis server 102 is displayed on camera parameter 1202, the user can quickly correct the deviation in the angle of view of camera 101 through intuitively operating camera parameter 1202. Note that a conversion table of the deviation amount of camera 101 and the set values of the pan and tilt of camera 101 are saved in advance in image analysis server 102, and the set values of the pan and tilt of camera 101 are calculated based on the conversion table and displayed on camera parameter 603.

Adjustment 1 screen 1201 further includes superimposing button 1204. The user can superimpose a frame image corresponding to at least one of intrusion detection area 201 and fixed object area 608 on camera image 301 displayed on live image display portion 602 through pressing of superimposing button 1204.

Figure 13:
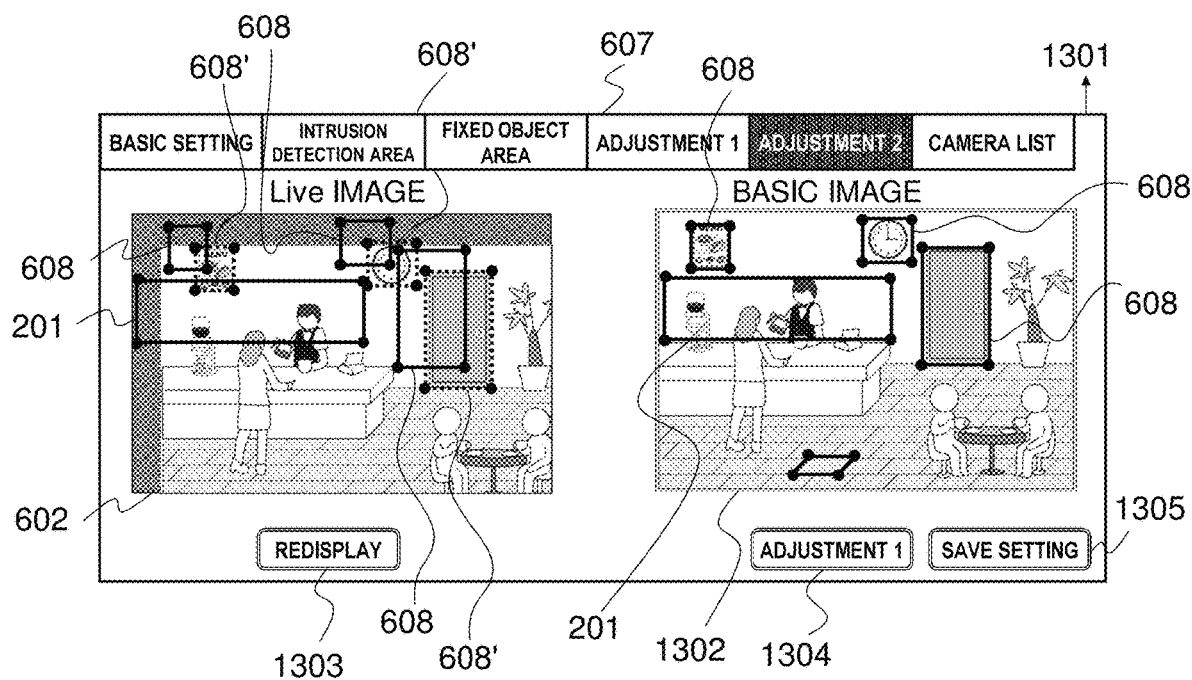
FIG. 13 is an explanatory diagram illustrating an adjustment 2 screen.

Adjustment 1 screen 1201 further includes setting save button 1205. The user checks or corrects camera parameter 1202 of camera 101 in which the deviation in the angle of view is detected, and then presses setting save button 1205 to shift the screen to adjustment 2 screen 1301 as illustrated in FIG. 13. Unless the user presses setting save button 1205 provided on adjustment 1 screen 1201, the screen does not shift to adjustment 2 screen 1301.

Adjustment 2 screen 1301 includes live image display portion 602 and basic image display portion 1302. Live image display portion 602 indicates camera image 301 at the time of detecting the deviation in the angle of view in camera 101. Basic image display portion 1302 shows the basic image registered in the basic image registration processing. Camera image 301 displayed on live image display portion 602 shows intrusion detection area 201 and fixed object area 608 (solid-line frame) set in the basic image registration processing, and fixed object area 608' (broken-line frame) detected on camera image 301 with fixed object area 608' being superimposed.

Adjustment 2 screen 1301 further includes redisplay button 1303. When pressing redisplay button 1303, the user can check the degree of superimposing (correction degree of a deviation in an angle of view) between fixed object area 608 (solid-line frame) and fixed object area 608' (broken-line frame) in which corrected camera parameter 1202 is reflected. The user checks the degree of superimposing between fixed object area 608 (solid-line frame) and fixed object area 608' (broken-line frame) to be capable of checking the correction degree of the deviation in the angle of view. When determining that the redisplay result is not appropriate, the user can switch the display screen of surveillance terminal 103 to adjustment 1 screen 1201 through pressing of adjustment 1 button 1304 provided on adjustment 2 screen 1301, and correct the deviation in the angle of view again through operating camera parameter 1202.

Adjustment 2 screen 1301 further includes setting save button 1305. When the user checks the correction degree of the deviation in the angle of view and determines that the correction degree is appropriate, the user can save corrected camera image 301 as a new basic image in basic image accumulation unit 403 in association with camera parameters 1202 to update the basic image through pressing of setting save button 1305.

As illustrated in FIGS. 12 and 13, the user can switch the screen to screens (for example, various setting screens) desired to be displayed by the user on surveillance terminal 103 through pressing of screen switching tabs 607 provided on angle-of-view adjustment screens of adjustment 1 screen 1201 and adjustment 2 screen 1301.

Then, a notification screen displayed on surveillance terminal 103 in a case where the plurality of cameras 101 is set according to the present exemplary embodiment will be described.

Figure 14:
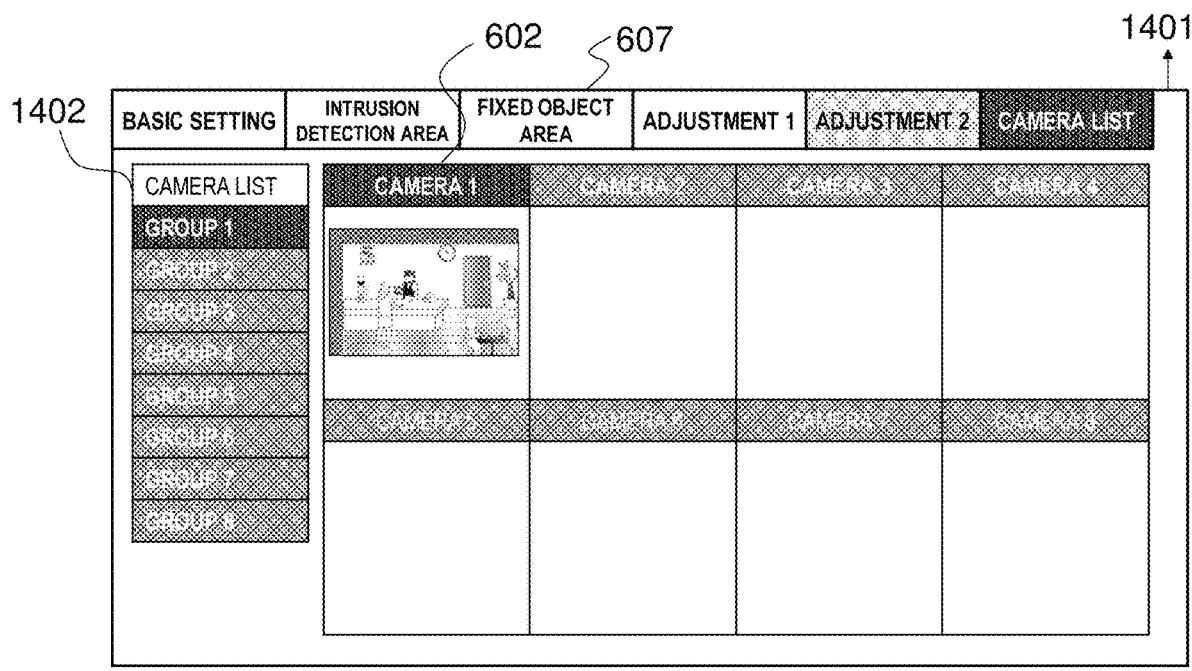
FIG. 14 is an explanatory diagram illustrating a camera list screen.

In surveillance terminal 103, when camera 101 in which a deviation in an angle of view has occurred is detected among the plurality of installed cameras 101, camera list screen 1401 grouped in units of areas as illustrated in FIG. 14 is displayed as the notification operation for notifying the user in response to an instruction from image analysis server 102.

Camera list screen 1401 includes live image display portion 602 corresponding to each camera 101 included in each group (predetermined area). Live image display portion 602 indicates camera image 301 captured by each camera 101 at the time of detecting the deviation in the angle of view.

Since background of a group icon of camera 101 in which the occurrence of a deviation in an angle of view has been detected is displayed in a color (for example, red) different from other group icons, the user can quickly understand which camera 101 among the plurality of installed cameras 101 has abnormality. In the present exemplary embodiment, the background color is changed, but the display method is not limited thereto, and other highlighted display such as shading, patterning, and blinking may be performed.

Further, the user can switch and check a list screen of cameras 101 assigned to each group through pressing of a tab of camera list 1402 provided on camera list screen 1401. Note that, as an example of the group includes a case where a group is set for each predetermined space such as a hotel lobby or a dining room, but the group is not limited thereto.

Figure 15:
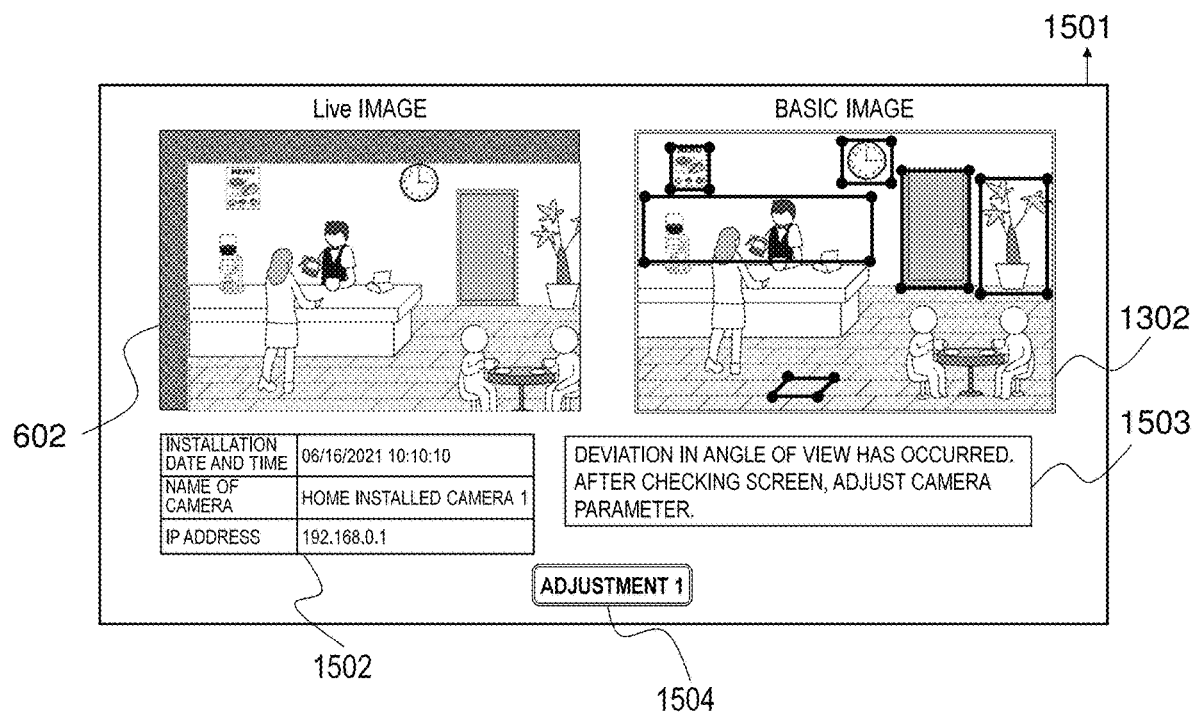
FIG. 15 is an explanatory diagram illustrating a viewer screen.

When the user presses any one of live image display portions 602 corresponding to cameras 101 provided on camera list screen 1401, the screen can shift to viewer screen 1501 that displays pressed camera image 301 of camera 101 and the basic image as illustrated in FIG. 15.

Viewer screen 1501 includes live image display portion 602 of camera 101 and basic image display portion 1302. Live image display portion 602 indicates camera image 301 at the time of detecting the deviation in the angle of view corresponding to camera 101 selected on camera list screen 1401 by the user. In addition, basic image display portion 1302 indicates the basic image corresponding to camera 101 selected on camera list screen 1401 by the user.

Viewer screen 1501 includes camera parameter 1502, comment display portion 1503, and adjustment 1 button 1504. Comment display portion 912 indicates a comment that makes the user to press adjustment 1 button 1504.

The user presses adjustment 1 button 1504 to be capable of switching the display screen of surveillance terminal 103 to adjustment 1 screen 1201 as illustrated in FIG. 12.

After switching the display screen of surveillance terminal 103 to adjustment 1 screen 1201, the user can quickly correct the deviation in the angle of view in camera 101 in accordance to execution of the same processing as described above.

Further, when the deviation in the angle of view has occurred in the plurality of cameras 101, the user presses the tab of the camera list of screen switching tab 607 provided on adjustment 1 screen 1201 after completion of the correction of one camera 101 in which the deviation in the angle of view has occurred. This makes it possible to redisplay camera list screen 1401. As a result, the user can quickly shift to correction of remaining camera 101 in which the deviation in the angle of view has occurred.

In the present exemplary embodiment, the specification is such that camera list screen 1401 is displayed again by pressing the tab of the camera list of screen switching tab 607, but the present disclosure is not limited thereto. For example, the display screen of surveillance terminal 103 may be automatically switched to camera list screen 1401 by pressing setting save button 1305 provided on adjustment 2 screen 1301.

Second Exemplary Embodiment

Figure 16:
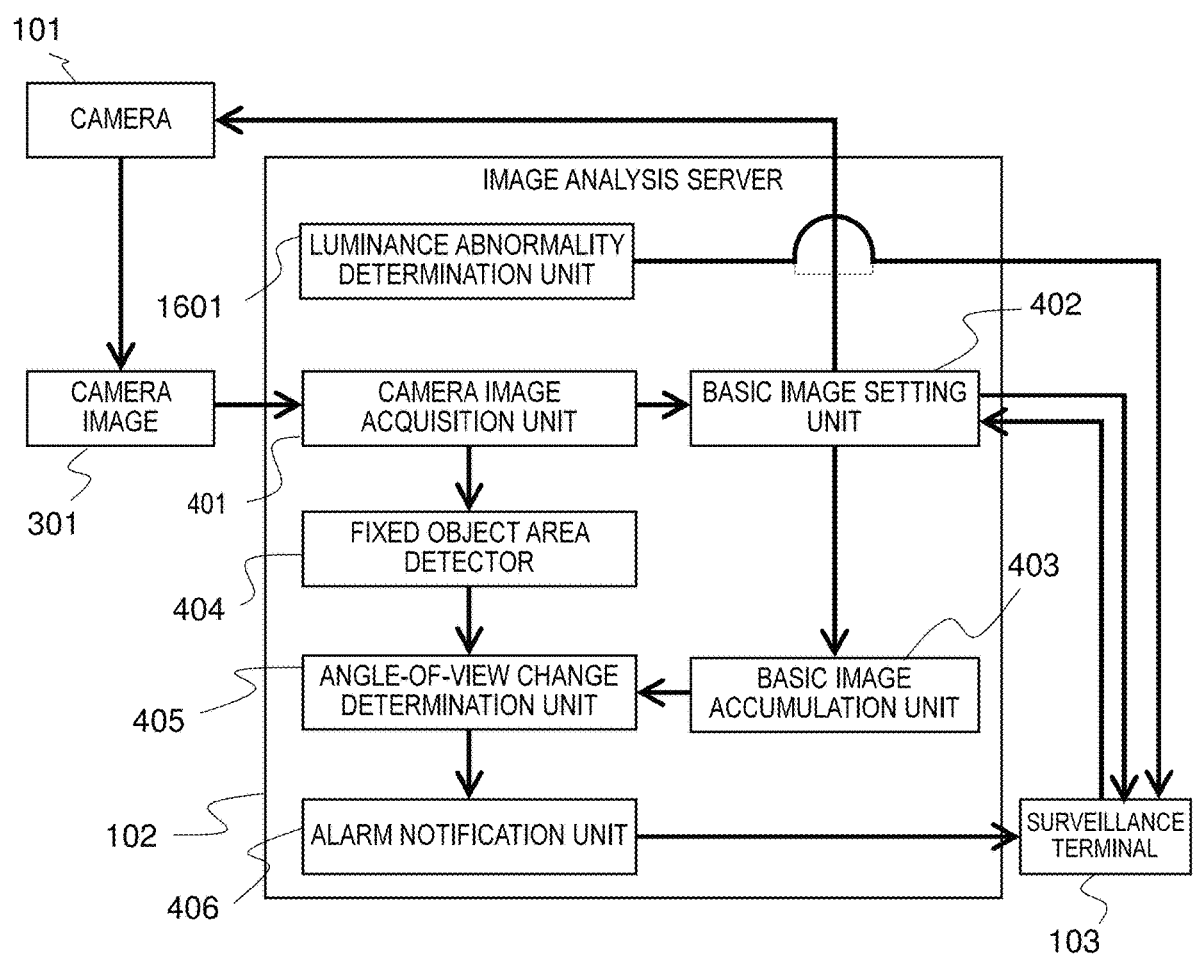
FIG. 16 is an explanatory diagram illustrating outlines of luminance abnormality determination processing and angle-of-view deviation detection processing.

A second exemplary embodiment will be described. Note that points not specifically mentioned here are similar to those in the above exemplary embodiment. FIG. 16 is an explanatory diagram illustrating outlines of luminance abnormality determination processing and angle-of-view deviation detection processing.

In the present exemplary embodiment, as illustrated in FIG. 16, image analysis server 102 includes luminance abnormality detection unit 1601. Image analysis server 102 detects whether camera 101 has failed based on a luminance distribution of camera images 301 acquired from camera 101 at regular time intervals and a luminance distribution of a basic image registered in basic image registration processing (luminance abnormality determination processing).

Here, when camera 101 has failed, the intrusion detection processing cannot be appropriately performed just after the deviation in the angle of view is adjusted. Therefore, the user is notified that camera 101 has failed. On the other hand, when camera 101 does not fail, the intrusion detection processing can be appropriately performed, and thus, the intrusion detection processing and the angle-of-view deviation detection processing are continued.

When the user is notified that the camera 101 has failed, a worker replaces camera 101. This enables camera 101 to continue the intrusion detection processing and the angle-of-view deviation detection processing. At this time, image analysis server 102 determines whether camera 101 has failed, and determines that camera 101 is in a state where the intrusion detection processing and the angle-of-view deviation detection processing can be continued. Image analysis server 102 then notifies a person in charge that where the intrusion detection processing and the angle-of-view deviation detection processing can be resumed.

Figure 17:
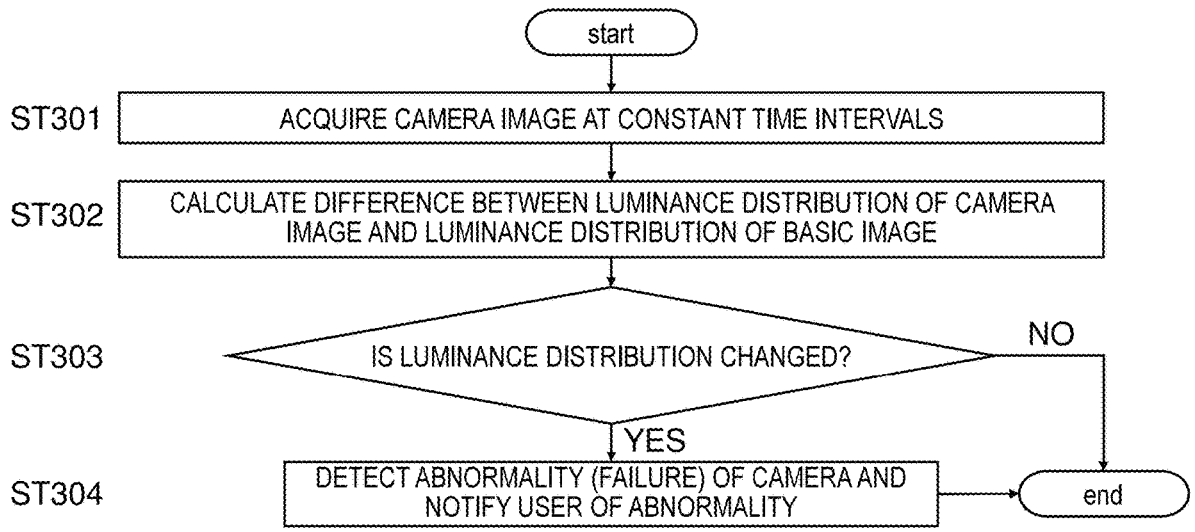
FIG. 17 is a flowchart illustrating a procedure of the luminance abnormality determination processing.

Then, a luminance abnormality determination processing to be performed by image analysis server 102 according to the second exemplary embodiment will be described. FIG. 17 is a flowchart illustrating a procedure of the luminance abnormality determination processing.

The luminance abnormality determination processing is performed in image analysis server 102. Image analysis server 102 acquires camera images 301 of the surveillance area captured by camera 101 at regular time intervals. (ST301)

Image analysis server 102 calculates a difference between a luminance distribution of obtained camera image 301 and a luminance distribution of the basic image registered in the basic image registration processing. (ST302)

Image analysis server 102 checks whether if the average value of a luminance signal of the basic image exceeds a predetermined threshold to detect whether camera 101 has failed. (ST303)

When the difference in luminance is within the predetermined threshold, image analysis server 102 ends the luminance abnormality determination processing.

When the average value of the luminance signal of the basic image exceeds the predetermined threshold, image analysis server 102 detects a failure of camera 101 and notifies the user about the result via surveillance terminal 103. (ST304)

Note that the luminance abnormality determination processing performed by image analysis server 102 according to a second exemplary embodiment needs to be performed under an environment where an appropriate light amount can be obtained at the time of capturing camera image 301. Therefore, image analysis server 102 according to the present exemplary embodiment may have a specification in which execution of the above-described luminance abnormality determination processing can be switched between on and off by a function such as a timer in a specific time zone in which an appropriate light amount cannot be obtained.

The exemplary embodiments have been described as exemplification of the technique disclosed in the present application. However, the technology of the present disclosure is not limited to them, and is also applicable to exemplary embodiments in which changes, replacements, additions, omissions, and the like are made. Further, a new exemplary embodiment can be made by combining the respective components described in the above exemplary embodiments.

The surveillance device and the surveillance system according to the present disclosure are useful as a surveillance device and a surveillance system that, when a deviation in an angle of view of a camera has occurred, can reliably detect the deviation in the angle of view and easily adjust a deviation amount of the angle of view, and detects that a person has entered an entry prohibited area based on a camera image obtained by capturing a monitoring area to make a notification about the person.

What is claimed is:

1. A surveillance device, comprising:
a processor that generates an alarm when detecting an alarm generation target that has entered an intrusion detection area, based on a captured image captured by an imaging device; and
a memory that stores an instruction,
wherein the processor, when conducting the instruction stored in the memory,
acquires a basic image of the captured image to set a basic area corresponding to a fixed object included in the basic image,
acquires a live image of the captured image to extract a reference area corresponding to the fixed object included in the live image,
calculates a deviation amount of an angle of view based on a result of a comparison in standard position between the basic area and the reference area, and
generates and displays a surveillance screen including an angle-of-view adjustment screen for guidance on an operation for cancelling the deviation amount of the angle of view, and
wherein the processor interposes an absolute position of the intrusion detection area in the comparison in the standard position between the basic area and the reference area.

2. The surveillance device according to claim 1, wherein the basic area is set based on an outline of the fixed object.

3. The surveillance device according to claim 1, wherein the processor presents a plurality of candidate basic areas that are candidates for the basic area, and sets the basic area based on an operation by a user for selecting any of the plurality of candidate basic areas.

4. The surveillance device according to claim 3, wherein the parameter includes an installation date and time of the imaging device, a name of the imaging device, an IP address, pan, tilt, or zoom as a parameter item.

5. The surveillance device according to claim 1, wherein the angle-of-view adjustment screen includes a parameter relating to an orientation of the imaging device, and
the deviation amount of the angle of view is cancelled based on an operation by a user for adjusting the parameter.

6. The surveillance device according to claim 1, wherein the angle-of-view adjustment screen includes
a display portion that indicates the live image, and
a superimposing button that superimposes at least one of the intrusion detection area and the basic area on the live image.

7. The surveillance device according to claim 1, wherein the angle-of-view adjustment screen includes a redisplay button to be used for checking whether a deviation has occurred between the basic area and the reference area after adjustment of a parameter.

8. The surveillance device according to claim 7, wherein the angle-of-view adjustment screen indicates a parameter item that causes the deviation amount of the angle of view in a highlighted display method that is different from a method for displaying other parameter items.

9. The surveillance device according to claim 1, wherein the surveillance screen includes a screen switching tab that enables switching between various setting screens and the angle-of-view adjustment screen.

10. The surveillance device according to claim 1, wherein the processor
calculates a difference between a luminance distribution of the basic image and a luminance distribution of the live image to determine whether an abnormality has occurred in the imaging device, and
notifies a user that a failure has occurred when determining that the abnormality has occurred.

11. The surveillance device according to claim 10, wherein
the processor
uses average values of luminance signals as the luminance distribution, to calculate a change amount of an average value of the luminance signal of the basic image, and notify a user that the failure has occurred in the imaging device when the change amount exceeds a predetermined threshold.

12. A surveillance system that generates an alarm when detecting an alarm generation target that has entered an intrusion detection area, based on a captured image, the surveillance system comprising:
a plurality of imaging devices;
a server device including a processor and a memory, the memory storing an instruction, the server device being connected with the plurality of imaging devices via a network; and
a surveillance terminal that receives an alarm generated from the server device via the network,
wherein the processor, when conducting the instruction stored in the memory, acquires a basic image of the captured image to set a basic area corresponding to a fixed object included in the basic image, acquires a live image of the captured image to extract a reference area corresponding to the fixed object included in the live image, calculates a deviation amount of an angle of view based on a result of a comparison in standard position between the basic area and the reference area, and generates a surveillance screen including an angle-of-view adjustment screen for guidance on an operation for cancelling the deviation amount of the angle of view to transmit the surveillance screen to the surveillance terminal, and wherein the processor interposes an absolute position of the intrusion detection area in the comparison in the standard position between the basic area and the reference area.

13. The surveillance system according to claim 12, wherein the surveillance terminal includes a mobile terminal having a display screen that displays information transmitted from the server device.

14. The surveillance system according to claim 12, wherein, when detecting a deviation in an angle of view in at least one of the plurality of imaging devices, the server device transmits a list screen where live images of the plurality of imaging devices installed in a predetermined area are checked, to the surveillance terminal.

15. The surveillance system according to claim 14, wherein the server device transmits, based on an operation by a user for selecting any live image from the live images displayed on the list screen, a viewer screen of an imaging device corresponding to the selected live image among the plurality of imaging devices.

16. The surveillance system according to claim 15, wherein the server device transmits the viewer screen, including the selected live image of the imaging device selected from among live images of the plurality of imaging devices by the user, the basic image of the imaging device, a parameter of the imaging device, or a comment that notifies that the deviation in the angle of view has occurred in the imaging device.

17. A surveillance method for causing a processor to perform alarm generation processing when an alarm generation target that has entered an intrusion detection area is detected based on a captured image captured by an imaging device, the surveillance method causing the processor, when conducting an instruction stored in a memory, to:

acquire a basic image of the captured image to set a basic area corresponding to a fixed object included in the basic image;

acquire a live image of the captured image to extract a reference area corresponding to the fixed object included in the live image;

calculate a deviation amount of an angle of view based on a result of a comparison in standard position between the basic area and the reference area; and generate and display a surveillance screen including an angle-of-view adjustment screen for guidance on an operation for cancelling the deviation amount of the angle of view, wherein the processor interposes an absolute position of the intrusion detection area in the comparison in the standard position between the basic area and the reference area.

* * * * *